United States Patent [19]

Levy et al.

[11] 3,772,519
[45] Nov. 13, 1973

[54] METHOD OF AND APPARATUS FOR THE SEPARATION OF ISOTOPES

[75] Inventors: Richard H. Levy, Boston; George Sargent Janes, South Lincoln, both of Mass.

[73] Assignee: Jersey Nuclear-Avco Isotopes Incorporated, Bellevue, Wash.

[22] Filed: Mar. 25, 1970

[21] Appl. No.: 25,605

[52] U.S. Cl.. 250/41.9 G, 250/41.9 SE, 250/41.9 S, 250/41.9 ME
[51] Int. Cl. ........................................... H01j 39/34
[58] Field of Search ................ 250/41.9 G, 41.9 SE, 250/41.9 S, 41.9 ME, 41.9 DS

[56] References Cited
UNITED STATES PATENTS

| | | | |
|---|---|---|---|
| 3,443,087 | 5/1969 | Robieux et al. | 250/41.9 |
| 3,478,204 | 11/1969 | Brubarer et al. | 250/41.9 |
| 2,938,116 | 5/1960 | Benson et al. | 250/41.9 |

*Primary Examiner*—William F. Lindquist
*Attorney*—Melvin E. Frederick

[57] ABSTRACT

A method of and apparatus for the separation of an isotope from a working medium wherein a beam of atoms comprising the working medium may be generated in an oven and collimated with a suitable collimator. The collimated beam of atoms is directed through an evacuated region where two photon beams are applied to the beam and function respectively to excite and ionize a selected isotopic constituent of the atomic beam. The ionized isotope may then be removed from the atomic beam by electric or magnetic fields and collected on a collecting plate.

53 Claims, 3 Drawing Figures

RICHARD H. LEVY
G. SARGENT JANES
INVENTOR.

BY Melvin E. Frederick

ATTORNEY

METHOD OF AND APPARATUS FOR THE SEPARATION OF ISOTOPES

The present invention relates generally to the process of separating a given raw material into two or more parts in each of which the abundances of the isotopes of a given element differ from the abundances of the isotopes of the same element in the raw material. More particularly, the invention relates to a method of and apparatus for the separation of the two principal isotopes of uranium.

The separation of quantities of uranium into two parts of which one is enriched in the fissionable isotope $U^{235}$ while the other part is correspondingly depleted in $U^{235}$ is an important process for nuclear applications. The only separation method now used on an industrial scale is the gaseous diffusion process. Many alternative methods have been suggested such as, for example electromagnetic separation, centrifugal separation, and separation by the thermal diffusion, but none of these are known to exhibit substantial advantages over the method of separation by gaseous diffusion.

The present invention is an improvement of yet another isotopic separation process shown and described only broadly in the U.S. Pat. No. 3,443,087, issued May 6, 1969, to Jean Robieux and Jean-Michel Auclair to which reference is made. The isotope shift which pertains to the spectra of elements or molecular compounds is an effect important to the Robieux et al patent as well as the present invention. Particular lines in the spectrum of a particular isotope of a given element may have wavelengths which differ slightly from the wavelengths of the corresponding lines in the spectrum of another isotope of the same element. Similarly, if the elements from which a molecular compound is constituted are isotopically pure, the spectral examination of compounds containing different isotopes will generally show slight shifts in the wavelengths of particular lines in the spectrum of the compound.

The isotope shift is present in both the emission and absorption of light. In emission, the effect has been used to measure the isotopic composition of samples of several elements. In the case of uranium, for example, a suitable line is one which has the wavelength 5027.4A. This line is centered at 5028.295A. for the fissionable isotope $U^{235}$, and at 5027.398A. for $U^{238}$. The corresponding isotope shift in this case is 0.103A. Other lines also exhibit isotope shifts. In absorption, a gas composed of a mixture of isotopes may be illuminated by light containing a narrow range of wavelengths at or near the natural wavelength of one particular isotope. For example, a sample of uranium vapor containing atoms of $U^{235}$ and $U^{238}$ may be illuminated with a beam of light in which the wavelengths present are confined to a narrow band of 0.01A. centered at an average wavelength of 5027.295A. The light will be strongly absorbed by $U^{235}$ atoms, but only weakly absorbed by $U^{238}$ atoms. Atoms absorbing light quanta become excited, so that the effect of the illumination is to make a gas mixture composed of excited and unexcited (ground state) atoms in which the population of excited atoms will be enriched in $U^{235}$, and the population of ground state atoms will be correspondingly depleted in $U^{235}$.

The aforementioned Robieux et al. patent in accordance with isotope shift contemplates the illumination by two light sources of a gas composed of an uranium molecular compound such as uranium hexafluoride, $UF_6$. The bandwidth of the first light source is narrow and its wavelength is so chosen that is preferentially excites those $UF_6$ molecules which contain an atom of $U^{235}$. The second light source functions to ionize only those molecules in the mixture which are in excited states, leaving ground state molecules unaffected. Since the population of excited molecules produced by the first light source is enriched in $U^{235}$, it follows that the population of molecular ions produced by the second light source is enriched in $U^{235}$. The molecular ions produced in the previously described manner may then be separated from the neutral molecules by use of electric or magnetic fields.

Whereas the Robieux et al. patent teaches the provision of the working medium in the form of molecular compound, a feature of the present invention is the provision of the working medium as uranium atoms. The provision of uranium atoms rather than molecular compounds containing uranium is advantageous for several reasons.

One such reason concerns the availability of lasers suitable for use as light sources for the primary illumination. The spectrum of uranium atoms exhibits many examples of the isotope shift effect in the visible part of the spectrum whereas for the most part identifiable isotope shifts in molecular compounds of uranium are found in the infra-red region of the spectrum. Lasers are desirable as light sources in this application by virtue of the large intensities available, but the narrow bandwidth and exact wavelength requirements for the first light source will require, in general, that a finely tunable laser be used. Presently available dye lasers having bandwidths as small as 0.01A. may be tuned across the whole visible spectrum. "Dial-a-Line" lasers which are manufactured and sold by the Avco Everett Research Laboratory, Everett, Mass. may be used as sources of both exciting and ionizing photons. Should minor modification of this laser system be necessary in order to obtain the necessary narrow bandwidth and intensity, this may be accomplished by using a conventional etalon filter to obtain a narrow bandwidth and by configuring the laser in a master oscillator power amplifier mode of operation wherein one laser is used to control another to achieve the additionally required intensity for the exciting source. Such lasers may be used for the selective excitation of $U^{235}$ atoms in accordance with the teaching of the present invention. In particular, the spectrum of the uranium atom exhibits at least one line which lends itself to the present invention. This is the above-mentioned line at 5027.4A. This wavelength is achievable by the aforementioned dye laser. Furthermore, the bandwidth of about 0.01A. achievable by the dye laser is much smaller than the isotope shift of 0.103A. between $U^{235}$ and $U^{238}$. From the preceding, it will clearly be seen that practical selective excitation of $U^{235}$ is possible in accordance with the present invention.

However, so far as is known, no tunable laser with the required narrow bandwidth is available that operates in the infra-red region of the spectrum. Accordingly, it is not apparent that a suitable laser is now or ever was available for use in accordance with the teaching of the Robieux et al patent.

A second advantage associated with the utilization of uranium atoms in accordance with the present invention is the relative freedom it permits in the choice of the wavelength of the second or ionizing laser. This freedom may be illustrated by supposing that the first or exciting laser is tuned to the aforementioned wavelength 5027.4A. The energy of a photon at this wavelength is about 2.5 eV. The ionization potential of uranium is about 4 eV. Thus, the energy required to ionize a uranium atom excited by the absorption of a photon at 5027.4A is somewhat greater than 1.5 eV. Hence, photons from the second or ionizing laser must have an energy in excess of about 1.5 eV in order to be capable of ionizing the excited atoms; on the other hand, they should not have an energy in excess 4 eV in order to avoid the direct ionization of ground state uranium atoms. The corresponding allowable wavelength range extends from about 3100A to about 8,000A. In contrast to the wide range of choices that are available when uranium atoms are used in accordance with the present invention, the use of molecular compounds selectively excited in the infra-red in accordance with the Robieux et al patent requires the ionizing radiation to lie in a narrow band in the ultraviolet. Within the wide range of wavelengths made available by the present invention, it is only necessary to insure that the wavelength chosen for the second light source does not correspond to a resonance line in uranium. This can be accomplished by referring to a standard table of the optical spectrum of uranium.

A third advantage associated with the utilization of uranium atoms in accordance with the present invention is that the above-mentioned wide range of wavelengths that can be used in the ionizing laser can permit two diffent types of exploitation. Firstly, for the example of the 5027.4A. line mentioned above, it may be noted that this wavelength is itself a permissible choice for the second laser. That is, the absorption of a second photon from the first laser by a single excited atom of $U^{235}$ can achieve the desired ionization from the excited state. In this event, the second light source may be dispensed with entirely. Secondly, the wide range of wavelengths suitable for the second laser may permit the phenomenon of autoionization to be used to advantage. In the phenomenon of autoionization the probability of achieving photoionization is enhanced at certain well-defined wavelengths. The use of such a wavelength can increase the efficiency of a separation plant or it can reduce the optimum size of such a plant. In contrast to this, it is to be noted that the possibility of dispensing with the second light source or of using the phenomenon of autoionization is quite small if not non-existent where a molecular compound of uranium is used as the working medium in accordance with the teaching of the Robieux et al. patent.

A fourth advantage associated with the use of atoms in accordance with the present invention instead of molecular compounds is that such use of atoms avoids entirely a class of problems associated with chemaical or photochemical reactions. For instance, the illumination of $UF_6$ with ultraviolet light can lead to ionization, dissociation, or both. If only dissociation takes place, separation by electromagnetic means can not be achieved. Further, if both dissociation and ionization take place, then only one component can be ionized but it is not clear that the correct component will be ionized. Such problems do not arise when atoms are used in accordance with the present invention.

In accordance with a feature of the present invention, the working medium is provided in the form of a collimated atomic beam. Such a beam can, for example, be conveniently formed in atomic uranium by using an oven in which a uranium vapor is formed and which is connected by a collimator to an evacuated chamber. The atoms in such a beam are essentially all collected on a cooled plate facing the collimator on which the uranium condenses. If other collecting plates are disposed in the evacuated chamber containing the aforementioned collection plate at suitable locations not facing the collimator, $U^{235}$ atoms once ionized in accordance with the invention can be deflected out of the beam by electromagnetic means, for example, and then collected on such other collecting plates.

In accordance with another feature of the present invention, the operation of the separation system may be in part continuous and in part repetitively pulsed as follows: the oven and collimator operate best in a continuous mode whereby a beam of uranium atoms emerges steadily from the collimator. However, on account of the short natural lifetimes before spontaneous decay back to the ground state of the excited uranium atoms, it is desirable to operate the lasers in repetitive high power pulses. The natural lifetime of a uranium atoms excited by a photon at 5027.4A is about 100 nanoseconds (ns). Thus, the efficiency of the process will be improved if the excitation and ionization steps are completed in a time less than 55 ns. Fortunately, this requirement fits well with typical characteristics of lasers useful in the process. The two lasers must be arranged to illuminate the same volume and the firing of the two lasers must be nearly simultaneous. The repetition rate is determined by the consideration that essentially all the uranium emerging from the collimator should be subjected to at least one pair of light pulses from the lasers. The interval between pulses should, therefore, be approximately equal to the time taken by a typical atom of uranium in the beam emerging from the collimator to cross the region subject to illumination by the lasers.

Among other things, the present invention can be so arranged as to permit the achievement of large, efficient separation of uranium in a single stage, and in any event a separation substantially greater and more efficient than taught by the above-mentioned Robieux et al. patent. The considerations associated with the achievement of large efficient separations may be better understood by reference to an ideal process in accordance with the present invention. In an ideal process:

a. the beam of uranium emerging from the collimator consists wholly of neutral atoms in the ground state.

b. the process of extracting the ions from the atoms is free from losses associated with mixing, charge exchange, etc.

c. every exciting photon is absorbed by a ground state $U^{235}$ atom, and every ionizing photon is absorbed by an excited $U^{235}$ atom.

d. the laser pulses excite and ionize every $U^{235}$ atom but no $U^{238}$ atom.

When all these conditions are satisfied, the separation achieved is perfect in that each emerging stream is isotopically pure; furthermore, the process is ideally efficient in that just one exciting photon and one ionizing photon is required to separate one atom of $U^{235}$. The present invention teaches means and apparatus for approaching at least some of the ideal conditions outlined above.

Condition (a) is essential to the achievement of a good separation since if some of the uranium emerging from the collimator is excited or ionized before illumination, the extent to which the population of ions existing after illumination can consist solely of $U^{235}$ will clearly be impaired. In general, excitation is not expected to be a problem at typical densities, collision frequencies, and dimensions. But since temperatures higher than about 2,000° C are required in the oven, some degree of ionization of the emerging uranium beam, possibly on the order of a few percent, may occur as a result of thermal effects in accordance with the well-know Saha equation, and also as a result of contact ionization. Specific means to reduce the number of ions emerging from the collimator are discussed below in connection with the description of the preferred embodiment.

Condition (b) is likewise essential to the achievement of a good separation. In the ideal process, the situation after illumination by the two lasers is such that a perfect separation has been achieved in the limited sense that all the $U^{235}$ is ionized and none of the $U^{238}$ is ionized. But at that stage, no physical separation has been achieved. Physical separation may be achieved by the application of suitable electric or magnetic forces to the partially ionized gas — the ions being $U^{235}$ and the neutrals being $U^{238}$. Such a force is felt directly only by the ions, or in other words, only by the $U^{235}$. The acceleration produced by this force gives to the ions ($U^{235}$) a certain velocity relative to the neutrals ($U^{238}$). If this relative velocity is sustained, the ultimate result is the desired physical separation between $U^{235}$ and $U^{238}$.

Two types of collisions can interfere with the effective accomplishment of this separation, namely, charge exchange and kinetic collisions. In charge exchange collisions, a $U^{235}$ ion interacts with a $U^{238}$ neutral; after the interaction, it is the $U^{235}$ that is neutral while the $U^{238}$ is ionized. However, in charge exchange collisions, the exchange of momentum is negligible, so that any relative velocity between the $U^{235}$ and $U^{238}$ is not altered.

According to another feature of the present invention, the electro-magnetic force is to be applied to the partially ionized gas in a manner such that the acceleration phase is accomplished without appreciable degradation through charge exchange collisions. This means that the force is applied as a short pulse; the displacement of the ions during the pulse is so slight that no appreciable charge exchange can occur. Upon application of the force in this manner, the $U^{235}$ ions will indeed acquire a velocity relative to the $U^{238}$ neutrals. The force is turned off after a sufficient acceleration has been accomplished. Since, as explained above, there is no appreciable momentum transfer in charge exchange collisions, such collisions occurring after the acceleration pulse cannot degrade the degree of separation finally achieved, but merely affect the ratios of the ions to the neutrals in the streams of $U^{235}$ and $U^{238}$. These ratios have no importance in determining either the degree of separation acheived, or the efficiency of the overall process.

The second type of collision which can interfere with effective separation of the isotopes is momentum transfer collisions, also known as gas kinetic collisions. If the $U^{235}$ is given a velocity relative to the $U^{238}$, such collisions will eventually destroy such relative velocity and consequently make separation (or at least large degrees of separation) impossible.

Accordingly, another feature of the present invention, designed to reduce the effect of gas kinetic collisions, is the provision of the beam of atomic uranium in a form such that the dimension of the beam in one direction at an angle to the direction of its mean motion is short. The direction associated with this short dimension is referred to as the extraction direction. More precisely, for large separations, the thickness of the atomic beam in the extraction direction should be not greater than about one gas kinetic mean free path. The exact choice of this dimension depends inter alia, on the desired degree of separation, the density of the uranium vapor, the gas kinetic cross-section for uranium and other factors.

Condition (c) pertains rather to the efficient use of laser output power than to the degree of separation. If the lasers are to be used efficiently, they must illuminate enough gas to absorb their entire output. More precisely, the product of the density of $U^{235}$ atoms, and the length of the vapor in the direction of illumination must have a sufficiently great magnitude. The actual magnitude is dependent upon the cross-section for absorbing exciting and ionizing photons. In practice, of these two cross-sections, the cross-section for a photoionization is by far the smaller; therefore, the above-mentioned product is determined by the cross-section for photoionization. Although this cross-section is not precisely known, it is certainly so small that considerable lengths of uranium vapor will be required. In this connection, the phenomenon of autoionization may be important, since this phenomenon, if present, permits the selection of wavelengths at which the photoionization cross-section is unusually large.

The direction of the laser light should be perpendicular to the direction of mean motion of the atomic beam. But as explained above, condition (b) requires that the dimension of the atomic beam in one direction (the extraction direction) at the angle to the direction of mean motion of the atomic beam be short. On the other hand, condition (c) requires that another dimension of the atomic beam (the illumination direction) perpendicular to the direction of mean motion of the atomic beam be long. Therefore, according to a feature of the present invention, the cross-section of the atomic beam in a plane perpendicular to the direction of mean motion of the atomic beam should be long and thin in shape. The direction of mean motion, the extraction direction, and the illumination direction should be more or less perpendicular one to another. Apparatus for achieving this object, and typical dimensions are discussed below in connection with the preferred embodiment.

The final consideration relating to the degree and efficiency of separation is condition (d). While the exciting light will be much more strongly absorbed by the $U^{235}$ than by the $U^{238}$, there will nevertheless be at least some absorption by the $U^{238}$. The ionizing light will ionize all excited atoms, without distinction as to isotope. Thus, the absorption of exciting light by the $U^{238}$ will decrease the degree of separation achieved, and decrease the efficiency of utilization of the light. In addition, condition (d) requires that there be at least as many photons in each illuminating pulse as there are $U^{235}$ atoms in the column of uranium vapor illuminated.

If the column of $U^{235}$ vapor has a length in the direction of illumination on the order of the absorption length for an ionizing photon, it will, in the same direction, have length equal to many absorption lengths for an exciting photon. The absorption length for absorption of an exciting photon in the column of $U^{238}$ is longer than the corresponding length of the absorption of an exciting photon in the column of $U^{235}$ by the ratio of the respective cross-sections, but shorter in the ratio of the respective densities of $U^{238}$ and $U^{235}$. In some cases this absorption length may imply a significant absorption of the exciting light by the $U^{238}$, with consequent degradation of the overall performance. Accordingly, a variety of optional means for overcoming this problem are discussed below in connection with the preferred embodiment. These all involve means for introducing the exciting light into the uranium vapor in ways such that such exciting light does not traverse the full length of the vapor column before arriving at the point where it interacts. Of course, in all cases, the two illuminations must coincide in both space and time in the interaction region.

The novel features that are considered characteristic of the present invention are set forth in the appended claims; the invention itself, however, both as to its organization and method of operation together with additional objects and advantages thereof will best be understood by not only the preceding but also the following description of a preferred embodiment when read in conjunction with the accompanying figures in which:

Figure 1:
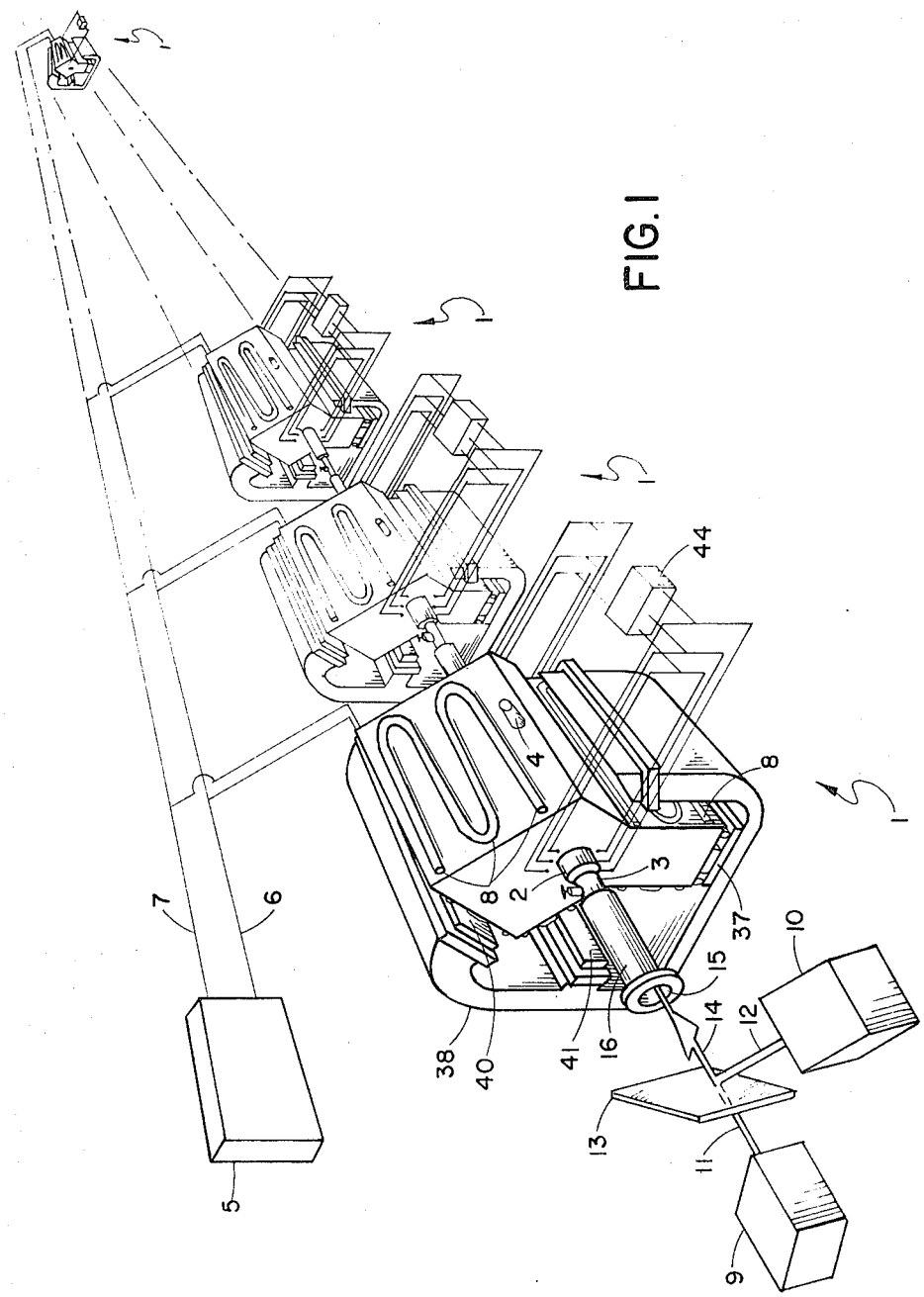
FIG. 1 is a perspective view of apparatus including a series of modules in accordance with the invention.

As previously mentioned, it is desirable to produce an atomic beam having a long thin cross-section. While the thickness of the beam may be on the order of centimeters, for example, the total length may be on the order of hundreds of meters or even more, and is only limited in principle by the laser powers available, and by optical diffraction effects. In order to simplify the construction of such an apparatus, it may be constructed as shown in FIG. 1 of a number of substantially similar modules 1 disposed along and enclosing an optical axis. Each module may be, for example, on the order of 1 meter in length, while transverse dimensions may be on the order of a few centimeters. The modules are preferably essentially interchangeable.

As shown in FIG. 1 the modules 1 are connected to each other by lengths of tubing 2, each such length of tubing carrying the vacuum valve 3. The vacuum valves 3 are so constructed that at least when they are open, an uninterrupted path is provided for the laser beams down the entire length of the column of modules. Each module 1 is vacuum tight, and is connected by a vacuum port 4 to a vacuum system (not shown) designed to maintain by standard means a base pressure on the order of about $10^{-5}$ mm of mercury in all parts of the apparatus. Each module also requires the provision of cooling and electric power for the ovens and other functions more fully described hereinafter. Electrical power is supplied to all the modules by a conventional power source 5 through leads 6 and 7. Cooling may be conventionally supplied by water from a suitable source (not shown) carried through pipes 8.

FIG. 1 also shows two lasers 9 and 10 at one end of the column. In this embodiment, the lasers illuminate substantially the same columnar volume extending through all the modules. This may, for example, be achieved as shown in FIG. 1 as follows: the output beam 11 from laser 9 and the output beam 12 from laser 10 both impinge upon the same area of a dichromic mirror 13. The properties of the dichromic mirror 13 are such that the beam 11 is substantially transmitted and the beam 12 is substantially reflected by the same dichromic mirror 13. When the angles are suitably adjusted, the desired illumination of the same columnar volume by both laser beams can be obtained. Thus the beam 14 leaving the dichromic mirror 13 contains both the exciting and the ionizing laser beams. It is not significant whether laser 9 or laser 10 is the exciting or ionizing laser or vice versa. It should also be understood that the single lasers shown, 9 and 10, may represent arrays of such lasers, suitably aligned and synchronized.

Figure 2:
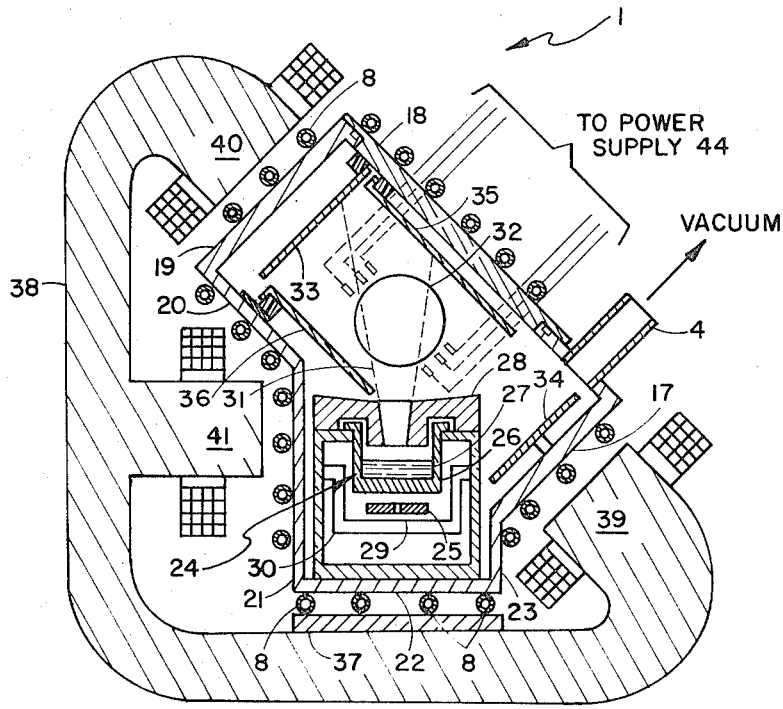
FIG. 2 is a side elevation of a typical module shown in FIG. 1.

The laser light enters the column of modules and the vacuum system through the window 15 which may be composed, for example, of optical grade quartz. A long evacuated pipe 16 is provided between the window and the point of entry of the first module in order to avoid possible contamination of the window surface by, for example, uranium vapor. For purposes of convenience and clarity, such electronic and other apparatus as may be needed to control the operation of the entire assembly is not shown. FIG. 2 shows a cross-section of a module in a plane perpendicular to the direction of the laser beam 14. Most of the components may have lengths in the direction of the laser beam of about 1 meter. The walls of the module are composed of a good vacuum material such as, for example, stainless steel, and are shown in sections labelled 17 through 23. Sections 21, 22, and 23 generally enclose the oven and its supply of uranium; sections 17 through 20 generally enclose the region of interaction with the laser beams, the region of application of the electromagnetic separation system, and the storage arrangements for the separated isotopes. One section, such as, for example, section 18 is made removable to provide access to the interior of the module for isotope removal, replenishment of the feed material, repair and maintenance and the like. End plates completing the enclosure and connected to the pipes 2 of FIG. 1 are not shown.

Cooling pipes 8 are carried on the various walls of the module to maintain the module at a moderate temperature. Each module in the assembled condition is vacuum tight and is provided with a connection 4 to a vacuum pumping system (not shown) designed to maintain the proper vacuum within the modules.

In the lower part of the module are disposed a uranium oven 24 and collimating means 28. These are comprised of heating elements 25, a crucible 26 containing liquid uranium metal 27, a collimator 28 and radiation baffles 29 and 30 suitably spaced one from another. The crucible 26 and the collimator 28 are composed of a suitable refractory material such as, for example, graphite. The temperature at the exposed surface of the uranium may be about 2,300°C in which case the density of uranium atoms in the uranium vapor will be about $10^{14}$ per cubic centimeter. The design of the collimator is such that it defines a slightly diverging beam of uranium vapor. One purpose of having the extent of the liquid uranium surface extend outside the area from which a straight line might be drawn right through the collimator is the following: contact ionization of uranium atoms is more probable on graphite surfaces than on liquid uranium surfaces. Thus, the arrangement shown reduces the fraction of ions in the emergent beam of uranium. The purpose of the baffles 29 and 30 is to reduce the loss of heat from the oven region. The vertical arrangement of the oven assembly ensures that uranium atoms which strike the collimator (as opposed to those that escape through the collimator) will condense there into liquid form (the melting point of uranium is about 1,150°C) and flow back under gravity into the main pool of liquid uranium 27. Note that the collimator 28 is maintained at a temperature lower than the liquid uranium pool 27 but above the melting point of uranium.

The atomic beam emerging from the collimator into the upper section of the module substantially fills the region 31. The portion 32 of region 31 illuminated by the lasers is shown in FIG. 2 as circular; it need not necessarily have this shape, but it should be such that all the atoms in the beam must pass through the illuminated region. At the same time portion 32 should not extend far beyond the edges of the atomic beam. The repetition rate of the lasers preferably corresponds to the characteristic time taken by a uranium atom to cross the illuminated portion 32; 10 kiloHertz may be taken as typical.

Four collecting plates 33 through 36 are disposed around the illuminated portion 32 as shown. These plates may be composed of stainless steel or a suitable refractory material. The collecting plates are supported by the walls of the module, but the mechanical connections (which may be conventional) are arranged and adapted to leave the plates electrically insulated from the walls as well as from each other. The plates are maintained at a temperature sufficiently low that uranium atoms striking the plates condense in solid form. If necessary, cooling can be supplied to the plates to accomplish this purpose. In the absence of the extraction system, most of the uranium would impinge on plates 33 and 35. The extraction system as described below functions to drive $U^{235}$ onto plate 36, leaving mostly $U^{238}$ to impinge upon plates 33 and 35. Plate 34 will not collect much uranium, but is helpful in maintaining symmetry of the electric fields during the extraction phase.

Figure 3:
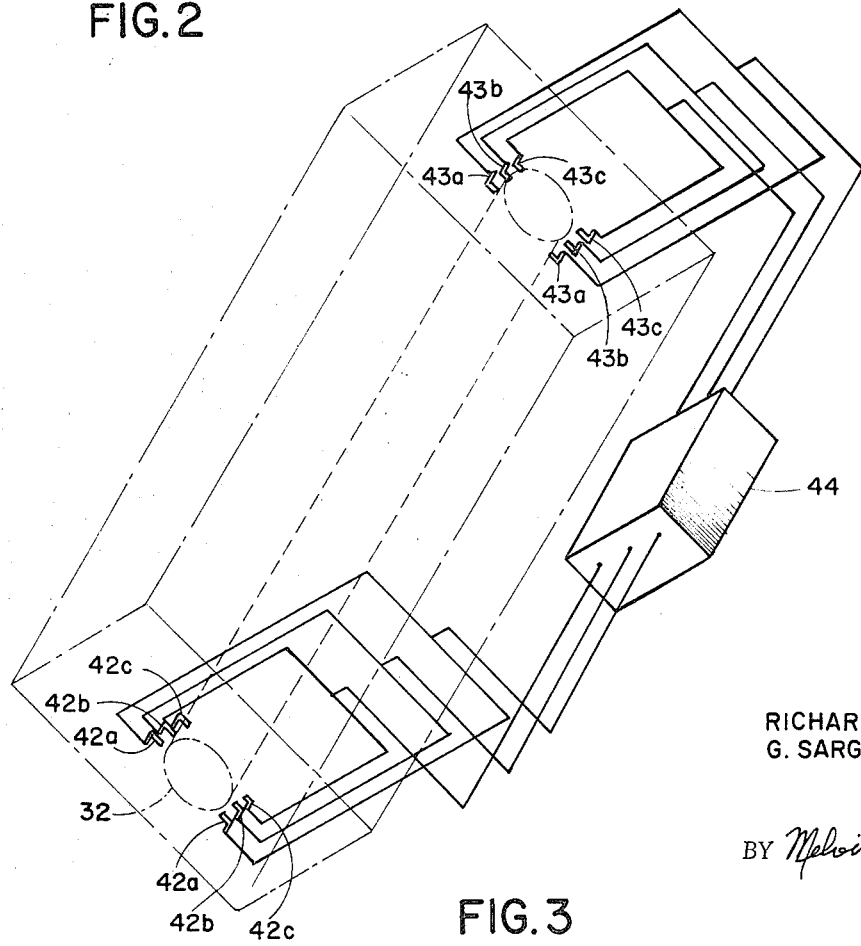
FIG. 3 is a diagrammatic representation of the electrode configuration shown in FIG. 2.

The extraction arrangement illustrated in FIGS. 2 and 3 operates on the principle of the low density crossed-field magnetohydrodynamic accelerator. The detailed manner of operation of this device will be described after its component parts have been indicated. The entire module rests on a support plate 37, and is almost surrounded by a piece of magnet iron 38 containing pole pieces 39, 40, and 41. Each pole piece has a suitably energized coil (shown, bu not numbered). In the region 32 illuminated by the lasers the direction of the magnetic field is substantially from pole piece 39 to pole piece 40. This magnetic field is essential to the working of the crossed-field accelerator.

In the region of the collimator 28, the magnetic field is substantially from pole piece 39 to pole piece 41, that is, it is at an angle to the mean direction of motion of the atomic beam in the collimator. The purpose of the pole piece 41 is to produce a magnetic field at or about the collimator 28 that inhibits the flow of any ionized uranium out of the collimator.

The typical magnetic field strengths may be between 100 and 1,000 gauss.

Further components of the crossed-field magnetohydrodynamic accelerator are best shown in FIG. 3. Electrodes 42a, b, and c and 43a, b, and c are provided at each end of each column illuminated by the laser, that is, about 1 meter apart in each module. A power supply 44 is connected to the oppositely disposed electrodes 42a, b, and c and 43a, b, and c to provide a controlled electric current through the column of partially ionized uranium vapor in portion 32. The power supply 44 is arranged and adapted in any suitable manner to maintain electrodes 42a, b, and c respectively at controlled different voltages. The aforementioned electrodes may be composed of a suitable material such as, for example, graphite. The subdivision of the electrodes is helpful in controlling the operation of the accelerator and the number of such subdivisions may be greater than or less than three. The electrodes must be disposed so as not to intercept the laser beams; they can be displaced slightly from the ends of the column in a direction parallel to the magnetic field. When the electrodes are subdivided as shown, the potentials on adjacent electrodes at each end of the column are maintained in such a way as to provide an electric field which will drive the ions towards the collecting plate 36.

It is convenient to consider that the power supply 44 provides a pulse of constant current, although in practice other arrangements may be acceptable. If the current, and the current density remain constant, the magnitude of the applied force per unit volume also remains constant. Therefore the ionized component of the uranium is subjected to a constant acceleration. If, for example, the current is 1 ampere, the cross section of the column is 1 square centimeter, the magnetic field is 1,000 gauss, and the number density of ions (which are $U^{235}$) is $10^{12}$ per cubic centimeter, the resulting acceleration is approximately $2.5 \times 10^{11}$ centimeters per second per second. If this acceleration is sustained for 1 microsecond, the final velocity of the $U^{235}$ ions in the direction of the plate 36 is $2.5 \times 10^5$ centimeters per second. Since this speed is substantially larger than speeds characteristic of the atomic beam which are on the order of $3 \times 10^4$ centimeters per second, a lesser acceleration may be sufficient. The displacement of the $U^{235}$ during the acceleration phase is 1.25 millimeters, a distance significantly smaller than likely values for the charge exchange mean free path. Thus, these sample values are consistent with the feature of the present invention mentioned above, namely that the extraction velocity should be acquired by the $U^{235}$ ions in such a manner that their displacements during the acceleration phase should be substantially less than a charge exchange mean free path.

The power supply 44 must provide the required current against the sum of two voltages. The first of these is the small voltage associated with the electrical resistance of the medium, perhaps about 10 volts when the module is 1 meter long. The second voltage is the back e.m.f. induced by the acceleration of the ions. This voltage is initially zero, but rises to a final value which may be about 250 volts when the ion speed is $2.5 \times 10^5$ centimeters per second.

According to a further feature of the present invention, reversal of the directions of the magnetic field and of the current flow in alternate modules prevents the build up of unnecessarily large voltages along the length of the column of modules.

The actual acceleration of the ions is accomplished by an electric field in the direction of the collection plate 36. This electric field is induced by the current flow and the magnetic field in accordance with the principles of cross-field magnetohydrodynamic accelerators operating in a regime where the electron cyclotron frequency greatly exceeds the collision frequency ($\omega_c \tau_e \gg 1$). The magnitude of this electric field for the parameters discussed above is approximately 60 volts per centimeter and this field governs the relative potentials of the electrodes at each end of the column when these electrodes are subdivided. The greater the degree of subdivision, the greater will be the reduction in losses due to inhomogeneities at the ends of the column. Electrical insulation of the four collecting plates from each other also helps to maintain the correct electric field distribution.

When the acceleration phase is complete, the power supply 44 is open-circuited so that no further forces are applied externally to the ions. Thereafter, as indicated earlier, the $U^{235}$ will continue to move at its final speed towards the collecting plate 36 regardless of the occurrence of charge exchange collisions.

The overall operation of the separation system as described above will now be discussed. The beam of atomic uranium emerges continuously from the oven via the collimator. The lasers operate in simultaneous pulses of perhaps 10 nanoseconds duration. Immediately following the laser pulses, the power supply for the crossed-field magnetohydrodynamic accelerator provides a pulse of perhaps 1 ampere for 1 microsecond and then the power supply is open-circuited. This procedure is repeated at a rate such that all the uranium emerging from the collimator is illuminated; an appropriate frequency being as previously noted, about 10 kiloHerz. Eventually, all the natural uranium in the oven will have been evaporated and at this time the module may be removed from the column and opened. The collecting plates carrying enriched and depleted uranium are removed, a fresh supply of raw material and fresh collecting plates are introduced, and the module is closed and returned to service.

Although the preferred embodiment has been discussed above in conjunction with FIGS. 1-3, many variations and modifications are possible, some of which are indicated below.

The considerable length of the system suggested in FIG. 1 stems from the necessity of providing a long path through the uranium vapor if the ionizing photons are to be substantially absorbed. However, the length of the system may be reduced by making the laser beams pass not once, but several times through the uranium vapor. This can be accomplished by using mirrors. For example, a mirror placed at the opposite end of the column of modules (using another long evacuated pipe similar to the pipe 16 in FIG. 1) will cause the laser beams to traverse the column twice and additional optical components can provide still further traversals. Since the absorption of the ionizing photons depends on the total path length through the vapor, the length of the column of modules can be reduced in rough proportion to the number of traversals. A further advantage is that in this way a smaller system may be built which (apart from losses due to the additional optical components) is just as efficient as a larger system.

In some cases it may also be desired to modify the topical system to take account of the problem mentioned above of absorption of some exciting radiation by $U^{238}$. This problem can be reduced by supplying the exciting radiation (but not the ionizing radiation) separately to each of several groups of modules, or even separately to each module. In either case, additional optical components and synchronizing arrangements will be required. Further, there is no requirement that both photon beams must be supplied to the uranium vapor from the same direction.

If several exciting lasers are used for any reason, it will be convenient to utilize one low power laser with suitable feedback frequency control to serve as a frequency standard for all the other exciting lasers. In this mode, the controlling laser operates as a high precision oscillator, and all other lasers operate as amplifiers.

It should also be understood that it is alternatively possible to accelerate the $U^{235}$ towards plate 35 instead of towards plate 36 by reversing either the current direction or the magnetic field direction but not both. This would require some modification of the geometry such that plate 35 would not intercept the neutral atomic beam, but may be found useful in the event that difficulties are experienced with contamination of plate 36 as a result of $U^{238}$ tails peeling off of plates 35 and 33.

A modification of the crossed-field magnetohydrodynamic accelerator can be obtained using a basic module similar to that shown and described in connection with FIG. 2 with the exception of the magnet and electrode structure. If the directions of the current and magnetic field are interchanged, the resultant force is unchanged in direction but reversed in sense. Thus, an accelerator is possible in which the magnetic field is directed parallel to the laser beam, and a current is caused to flow in the vapor in the direction connecting the collecting plates 34 and 35 of FIG. 2. Such a magnetic field could be provided for example by enclosing each module in a large solenoid. The electrodes in this case may extend along the length of the vapor column in each module, and be disposed on the sides of the column closest to plates 34 and 33, subdivision of the electrodes again being helpful. As compared with the case illustrated, an accelerator of this type may require a power supply providing a higher current at lower voltage for the same effect. There are advantages and disadvantages to both systems.

It might be possible to dispense entirely with the crossed-field magnetohydrodynamic accelerator. This possibility arises from the fact that if the electrons liberated from the $U^{235}$ atoms by the ionizing radiation have (or are given) energies on the order of a few electron volts, the gas composed of $U^{235}$ ions and electrons will expand at a speed greater than the thermal speed in the atomic beam by the square root of the ratio of the electron energy to the mean energy of the atoms in the beam. This expansion which is driven by electrical forces tends to remove the $U^{235}$ from the atomic beam so that it may be collected separately from the $U^{238}$. However, consideration of charge exchange effects suggests that this separation technique will only be efficient at densities lower than those discussed above. The use of a magnetic field to restrict the directions in which such expansion is possible will be helpful.

Finally, there are also several possible methods of producing the atomic vapor beam. The radiant oven heater could be replaced by electron beam or R.F. induction heating of the crucible and its charge. Alternatively, the crucible problem can be avoided entirely by utilizing either an electron beam or an intense laser beam to heat the surface of the metal and thereby stimulate direct surface evaporation without the necessity for raising the temperature of the entire body of material. Furthermore, it should be understood that the methods and apparatus described herein can also be utilized for the separation of other uranium isotopes than $U^{235}$ from a mixture of uranium isotopes by slight modification of the wavelength of the exciting radiation.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A method of separating isotopes of a material containing a first isotope and a second isotope comprising the steps of:
   a. producing from said material a beam of vapor consisting essentially of atoms of said isotopes, said atoms having a given direction of motion;
   b. exposing said beam of vapor to radiation at a predetermined wavelength to excite atoms of said first isotope without substantially exciting atoms of the second isotope;
   c. exposing said beam of vapor to radiation at a predetermined wavelength to ionize excited atoms of the first isotope without substantially ionizing atoms of the second isotope; and
   d. separating the ions resulting from step (c) from the non-ionized atoms by impressing a magnetic field and an electric current upon the beam, in a manner to thereby accelerate said ions out of said beam in a direction at an angle to said direction of motion.

2. The method as defined in claim 1 wherein the predetermined wavelengths of the radiations employed in steps (b) and (c) are substantially identical.

3. The method as defined in claim 1 wherein the predetermined wavelengths of the radiations employed in steps (b) and (c) are substantially different.

4. The method as defined in claim 1 wherein the beam produced in step (a) is long and narrow and has a generally rectangular cross section, the width dimension of said beam normal to said direction of motion being large compared to its thickness dimension also normal to said direction of motion and to said width dimension.

5. The method as defined in claim 4 wherein the separation of the ions from the non-ionized atoms comprises:
   a. impressing said magnetic field substantially normal to said width dimension, said magnetic field extending substantially along the entire width dimension, and
   b. impressing said electric current substantially parallel to said width dimension, said electric current extending substantially along the entire width dimension.

6. The method as defined in claim 5 wherein said electric current is pulsed, each pulse having a duration less than the mean free time for a charge exchange collision in said beam.

7. The method as defined in claim 4 and additionally including the step of providing a further magnetic field at the source of said beam at an angle to the direction of motion.

8. The method as defined in claim 4 wherein the separation of the ions from the nonionized atoms comprises:
   a. impressing said magnetic field substantially parallel to said width dimension, said magnetic field extending substantially along the entire width dimension; and
   b. impressing said electric current substantially normal to said width dimension, said electric current extending substantially along the entire width dimension.

9. The method as defined in claim 8 wherein said electric current is pulsed, each pulse having a duration less than the mean free time for a charge exchange collision in said beam.

10. The method as defined in claim 1 wherein the predetermined wavelength of the radiation employed in step (b) is in the visible spectrum.

11. The method as defined in claim 10 wherein the wavelength of the radiation employed in step (c) substantially corresponds to a transition between the excited state and an autoionization level of the excited atoms of said first isotope.

12. The method as defined in claim 1 in which, after said beam is exposed to the radiations employed in steps (b) and (c), said beam is again exposed to the radiations employed in steps (b) and (c) by reflecting the radiations employed in steps (b) and (c) so as to cause said radiations to transverse said beam, thereby increasing the yield of selective excitation and ionization of the atoms of said first isotope.

13. A method of separating isotopes of a material containing a first isotope and a second isotope comprising the steps of:
   a. producing from said material a vapor consisting essentially of atoms of said isotopes in the form of a long, narrow beam having a given flow direction and generally rectangular in cross section, the width dimension of said beam normal to its flow direction being large compared to its thickness dimension also normal to said flow direction and said width dimension;
   b. directing radiation at a first predetermined wavelength through said beam of vapor along the axis of its width dimension to excite atoms of said first isotope without substantially exciting the atoms of the second isotope;
   c. directing radiation at a second predetermined wavelength through said beam of vapor along the axis of its width dimension to ionize excited atoms of the first isotope without substantially ionizing atoms of the second isotope, said second predetermined wavelength being substantially different from said first predetermined wavelength; and
   d. separating the ions resulting from step (c) from the non-ionized atoms by impressing a magnetic field through the beam at an angle to said thickness dimension and by impressing an electric current through the beam at an angle both to said thickness dimension and to said magnetic field to accelerate the ions out of the beam in a direction at an angle to said flow direction.

14. The method as defined in claim 13 wherein said material is uranium and said vapor is produced by maintaining said uranium in an evacuated environment at a temperature in excess of its melting point whereby said evaporation of said uranium is produced, said vapor comprising substantially only neutral atoms evaporated from a liquid surface of the uranium.

15. The method as defined in claim 14 wherein the isotopes of said uranium which are separated are $U^{235}$ and $U^{238}$.

16. The method as defined in claim 15 wherein the isotope $U^{235}$ is separated from said beam substantially in the direction of its thickness dimension.

17. The method as defined in claim 16 wherein the first predetermined wavelength is in the visible spectrum.

18. The method as defined in claim 17 wherein the second predetermined wavelength substantially corresponds to a transition between the excited state and an autoionization level of the excited atoms of said first isotope.

19. The method as defined in claim 13 wherein the separation of the ions from the nonionized atoms comprises:
    a. impressing said magnetic field substantially normal to the axis of said width dimension, said magnetic field extending substantially along the entire width dimension; and
    b. impressing said electric current substantially parallel to the axis of said width dimension, said electric current extending substantially along the entire width dimension.

20. The method as defined in claim 19 wherein said electric current is pulsed, each pulse having a duration less than the mean free time for a charge exchange collision in said beam.

21. The method as defined in claim 13 and additionally including the step of providing a magentic field at the source of said beam at an angle to said direction of flow.

22. The method as defined in claim 13 wherein the separation of the ions from the nonionized atoms comprises:
    a. impressing the magnetic field substantially parallel to said width dimension, said magnetic field extending substantially along the entire width dimension; and
    b. impressing said electric current substantially normal to said width dimension, said electric current extending substantially along the entire width dimension.

23. The method as defined in claim 22 wherein said electric current is pulsed, each pulse having a duration less than the mean free time for a charge exchange collision in said beam.

24. An apparatus for separating isotopes of a material containing a first isotope and a second isotope comprising:
    a. sealable container means adapted to be connected to a vacuum pump, said container means having an opening concentric about an optical axis for admitting radiation to the interior of said container means;
    b. means disposed within said container means for providing an atomic beam of vapor of said material normal to and passing through said optical axis, said beam having a given flow direction;
    c. first collector plate means disposed within said container means for receiving said atomic beam;
    d. second collector plate means disposed within said container means adjacent said beam;
    e. a radiation source capable of producing radiation at a predetermined wavelength that excites the atoms of said first isotope but does not substantially excite the atoms of said second isotope;
    f. a radiation source capable of producing radiation at a predetermined wavelength which ionizes the excited atoms of said first isotope but does not substantially ionize the atoms of said second isotope;
    g. means for directing said radiations into said container along said optical axis through said atomic beam; and
    h. means for causing the resultant ions to be accelerated out of said atomic beam to impinge on said second collector plate means which comprises means for impressing a magnetic field and an electric current upon the beam.

25. The apparatus as defined in claim 24 wherein said means for causing the ions to impinge on said second collector plates comprises:
    a. means for providing a magnetic field at an angle to, extending along and passing through said optical axis; and
    b. means for providing an electric current extending along and including said optical axis.

26. The apparatus as defined in claim 24 which includes means for pulsing said electric current, each pulse having a duration less than the mean free time for a charge exchange collision in said beam.

27. The apparatus as defined in claim 24 and including additional means for providing a magnetic field at the source of said beam at an angle to the direction of flow of said beam to suppress the presence of ionized uranium atoms within said beam.

28. A method of separating a first isotope of elemental uranium from a second isotope of elemental uranium comprising the steps of:
    a. producing vapor of uranium atoms from a body of said elemental uranium by heating the surface of said body and thereby stimulate direct surface evaporation without the necessity for raising the temperature of the entire body of said elemental uranium;
    b. exposing said vapor to radiation at a predetermined wavelength to excite atoms of said first isotope without substantially exciting atoms of the second isotope;
    c. exposing said vapor to radiation at a predetermined wavelength to ionize excited atoms of the first isotope without substantially ionizing atoms of the second isotope; and
    d. separating the resultant ions from non-ionized atoms.

29. The method as defined in claim 28 wherein the predetermined wavelengths of the radiations employed in steps (b) and (c) are substantially identical.

30. The method as defined in claim 28 wherein the predetermined wavelengths of the radiations employed in steps (b) and (c) are substantially different.

31. The method as defined in claim 28 wherein the predetermined wavelength of the radiation employed in step (b) is in the visible spectrum.

32. The method as defined in claim 28 wherein the wavelength of the radiation employed in step (c) substantially corresponds to a transition between the excited state and an autoionization level of the excited atoms of said first isotope.

33. The method as defined in claim 28 wherein:
1. the vapor exposed to the radiations of steps (b) and (c) is in the form of a beam comprising atoms of said elemental uranium, said atoms having a given direction of motion, said beam being long and narrow and having a generally rectangular cross section, the width dimension of said beam normal to said direction of motion being large compared to its thickness dimension also normal to said direction of motion and to said width dimension;
2. radiation is directed at a first predetermined wavelength through said beam of vapor along the axis of its width dimension to excite atoms of said first isotope without substantially exciting atoms of the second isotope; and radiation is directed at a second predetermined wavelength through said beam of vapor along the axis of its width dimension to ionize excited atoms of said first isotope without substantially ionizing atoms of the second isotope, said second predetermined wavelength being substantially different from said first predetermined wavelength.

34. The method as defined in claim 28 in which, after said vapor is exposed to the radiations employed in steps (b) and (c), said vapor is again exposed to the radiations employed in steps (b) and (c) by reflecting the radiations employed in steps (b) and (c) so as to cause said radiations to traverse said vapor, thereby increasing the yield of selective excitation and ionization of the atoms of said first isotope.

35. A method of separating a first isotope of elemental uranium from a second isotope of elemental uranium comprising the steps of:
a. producing a beam of vapor of uranium atoms from said elemental uranium, said beam being long and narrow, having a given flow direction and generally rectangular in cross section, the width dimension of said beam normal to its flow direction being large compared to its thickness dimension also normal to said flow direction and said width dimension;
b. directing radiation at a first predetermined wavelength through said beam of vapor along the axis of its width dimension to excite atoms of said first isotope without substantially exciting atoms of the second isotope;
c. directing radiation at a second predetermined wavelength through said beam of vapor along the axis of its width dimension to ionize excited atoms of said first isotope without substantially ionizing atoms of the second isotope, said second predetermined wavelength being substantially different from said first predetermined wavelength; and
d. separating the resultant ions from non-ionized atoms by impressing a magnetic field and an electric current upon the beam, in a manner to thereby accelerate said ions out of said beam in a direction at an angle to said flow direction.

36. The method as defined in claim 35 wherein the separation of the ions from the nonionized atoms comprises:
a. impressing a magnetic field substantially normal to said width dimension, said magnetic field extending substantially along the entire width dimension; and
b. impressing an electric current substantially parallel to said width dimension, said electric current extending substantially along the entire width dimension.

37. The method as defined in claim 35 wherein said electric current is pulsed, each pulse having a duration less than the mean free time for a charge exchange collision in said beam.

38. The method as defined in claim 35 wherein the separation of the ions from the nonionized atoms comprises:
a. impressing a magnetic field substantially parallel to said width dimension, said magnetic field extending substantially along the entire width dimension; and
b. impressing an electric current substantially normal to said width dimension, said electric current extending substantially along the entire width dimension.

39. The method as defined in claim 35 wherein said electric current is pulsed, each pulse having a duration less than the mean free time for a charge exchange collision in said beam.

40. The method as defined in claim 35 and additionally including the step, prior to carrying out step (b), of providing a magnetic field at the source of said beam at an angle to said direction of motion to suppress the presence of ionized uranium atoms within the beam.

41. The method as defined in claim 35 wherein said vapor is produced by maintaining said uranium in an evacuated environment at a temperature in excess of its melting point whereby said evaporation of said uranium is produced, said vapor comprising substantially only neutral atoms evaporated from a liquid surface of the uranium.

42. The method as defined in claim 35 wherein the isotopes of said uranium which are separated are $U^{235}$ and $U^{238}$.

43. The method as defined in claim 35 wherein ions of isotope $U^{235}$ are separated from said beam substantially in the direction of its thickness dimension.

44. Method for separating ionized atoms of a first isotope from nonionized atoms of a second isotope of a material which comprises the steps of:
a. producing a beam of a vapor comprising said ionized atoms and nonionized atoms of said material, said atoms having a given direction of motion; and
b. impressing a magnetic field and an electric current upon said beam, in the manner to thereby accelerate said ionized atoms out of said beam in a direction at an angle to said direction of motion.

45. The method as defined in claim 44 and including the additional step of providing a further magnetic field at the source of said beam at an angle to said direction of motion.

46. The method as defined in claim 44 wherein said electric current is pulsed, each pulse having a duration less than the mean free time for a charge exchange collision in said beam. said 47. The method as defined in claim 44 in which said beam is produced in a form which is long and narrow and which has a generally rectangular cross section, the width dimension of said beam normal to said direction of motion being large compared to its thickness also normal to said direction of motion and to said width dimension.

48. The method according to claim 47 wherein the magnetic field is impressed substantially normal to said width dimension, said magnetic field extending substantially along the entire width dimension and the electric current is impressed substantially parallel to said width dimension, said electric current extending substantially along the entire width dimension.

49. The method according to claim 47 wherein the magnetic field is impressed substantially parallel to said width dimension, said magnetic field extending substantially along the entire width dimension and the electric current is impressed substantially normal to said width dimension, said electric current extending substantially along the entire width dimension.

50. Apparatus for separating ionized atoms of a first isotope from nonionized atoms of a second isotope of a material which comprises:
 a. means for producing a beam of vapor comprising said ionized atoms and nonionized atoms of said material, said atoms having a given direction of motion; and
 b. means for impressing a magnetic field and an electric current through said beam to accelerate said ionized atoms out of said beam in a direction at an angle to said direction of motion.

51. The apparatus as defined in claim 50 which includes means for producing said beam in a form which is long and narrow and which has a generally rectangular cross section, the width dimension of said beam normal to said direction of motion being large compared to its thickness also normal to said direction of motion and to said width dimension.

52. The apparatus as defined in claim 50 which includes means for impressing a further magnetic field at the source of said beam at an angle to said direction of motion.

53. The apparatus as defined in claim 50 which includes means for pulsing said electric current, each pulse having a duration less than the mean free time for a charge exchange collision in said beam.

* * * * *